Aug. 5, 1958 G. A. DESCHAMPS 2,845,711
MICROWAVE TRANSMISSION LINE CALCULATOR
Filed Jan. 26, 1953 8 Sheets-Sheet 1
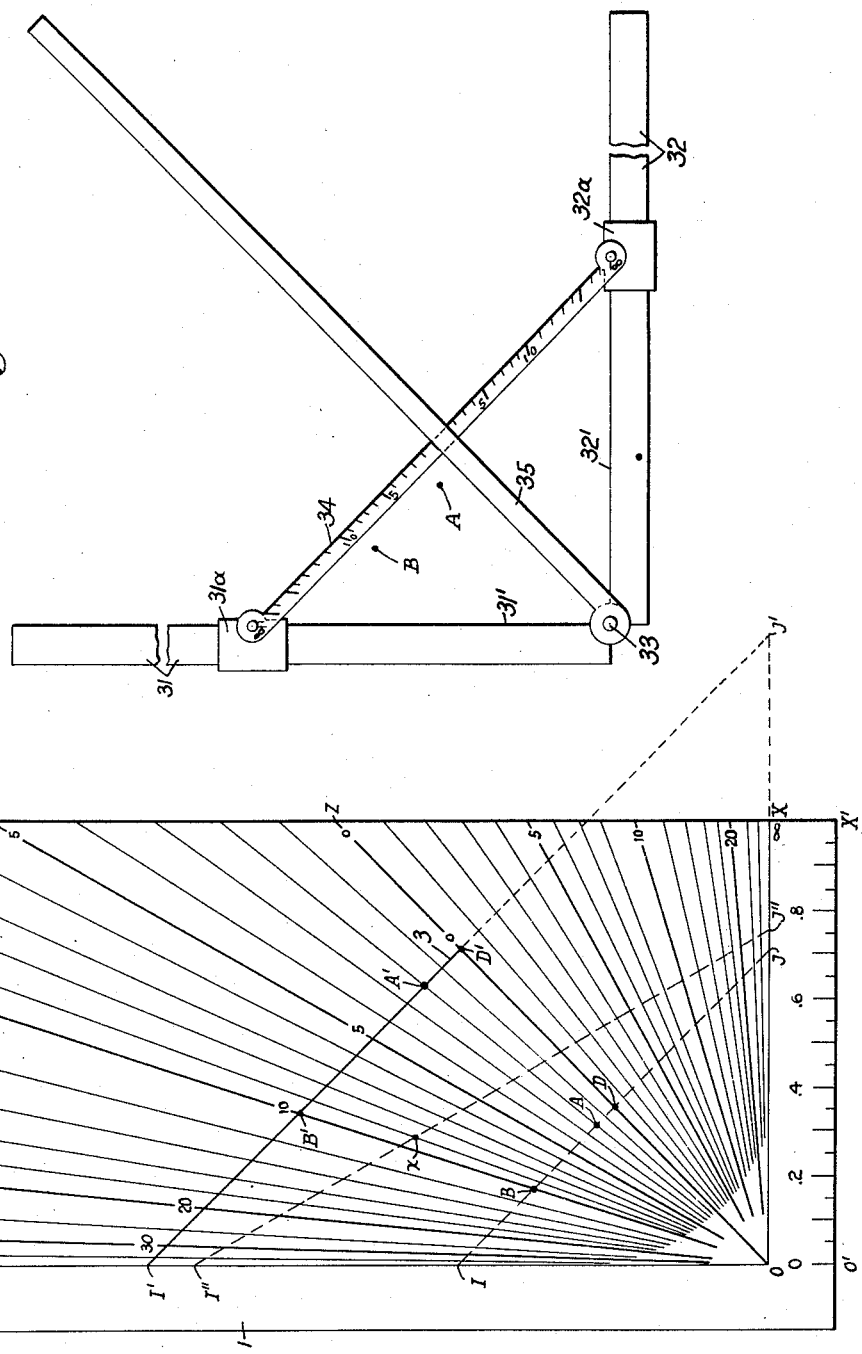
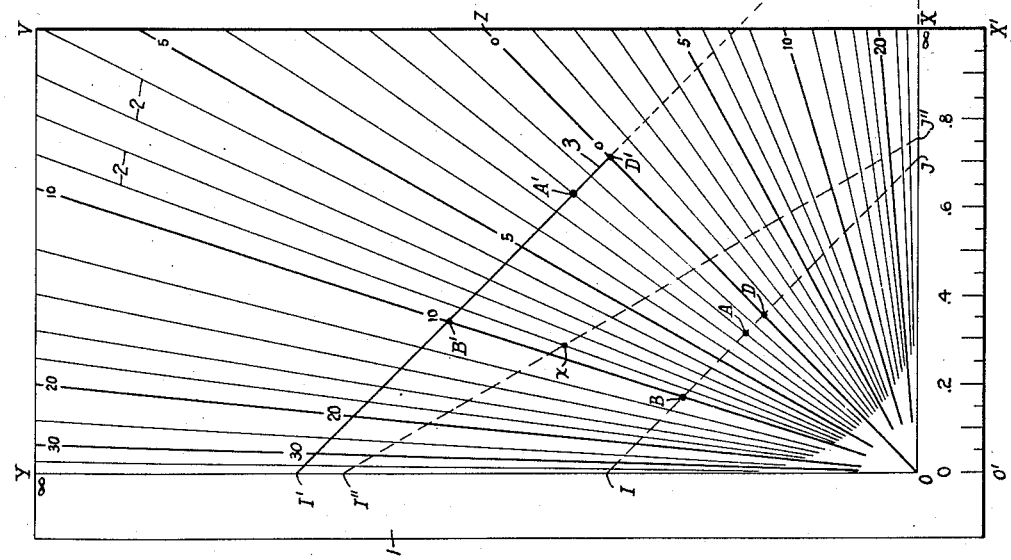
INVENTOR
GEORGES A. DESCHAMPS
BY
ATTORNEY Aug. 5, 1958　　　G. A. DESCHAMPS　　　2,845,711
MICROWAVE TRANSMISSION LINE CALCULATOR
Filed Jan. 26, 1953　　　　　　　8 Sheets-Sheet 2

INVENTOR
GEORGES A. DESCHAMPS
BY
Ernest Fanunk
ATTORNEY

Aug. 5, 1958      G. A. DESCHAMPS      2,845,711
MICROWAVE TRANSMISSION LINE CALCULATOR
Filed Jan. 26, 1953      8 Sheets-Sheet 3
*Fig. 3C*      *Fig. 3D*
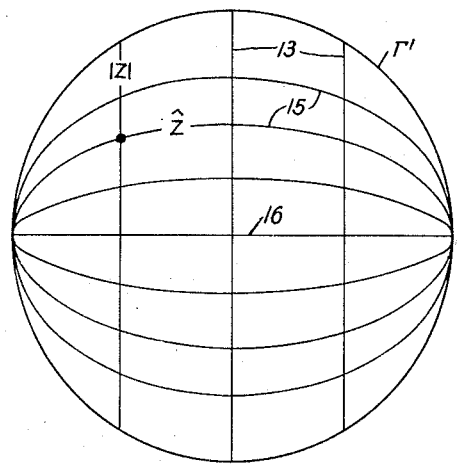 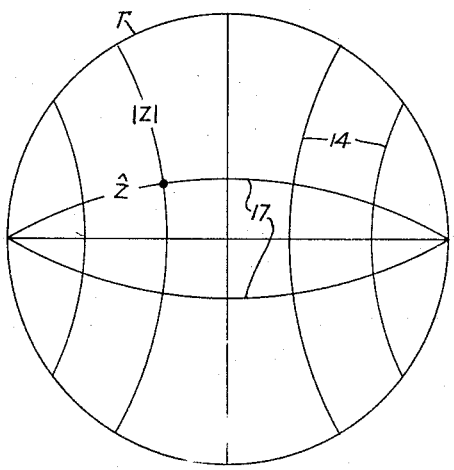
*Fig. 4A*
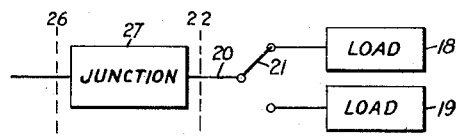
*Fig. 4B*      *Fig. 4C*
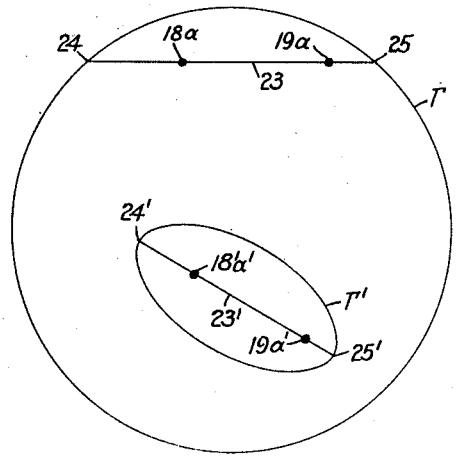 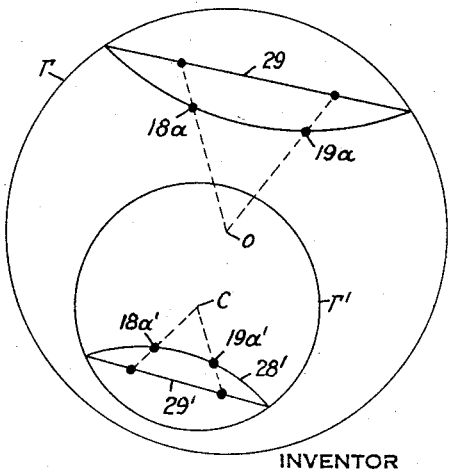
INVENTOR
GEORGES A. DESCHAMPS
BY
*Ernest Fanwick*
ATTORNEY

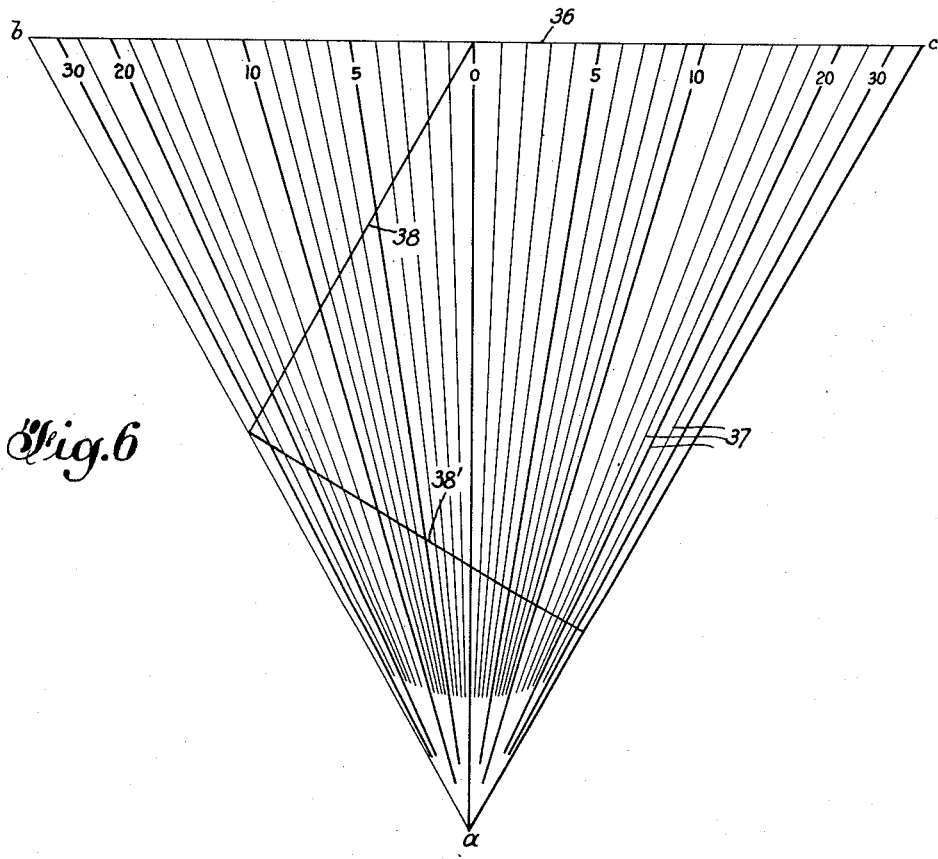
Fig.6
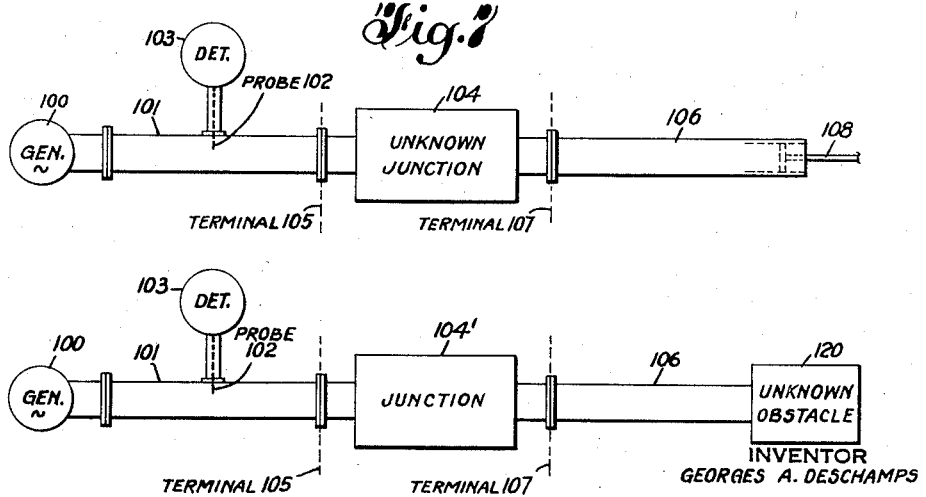
Fig.7
Fig.9

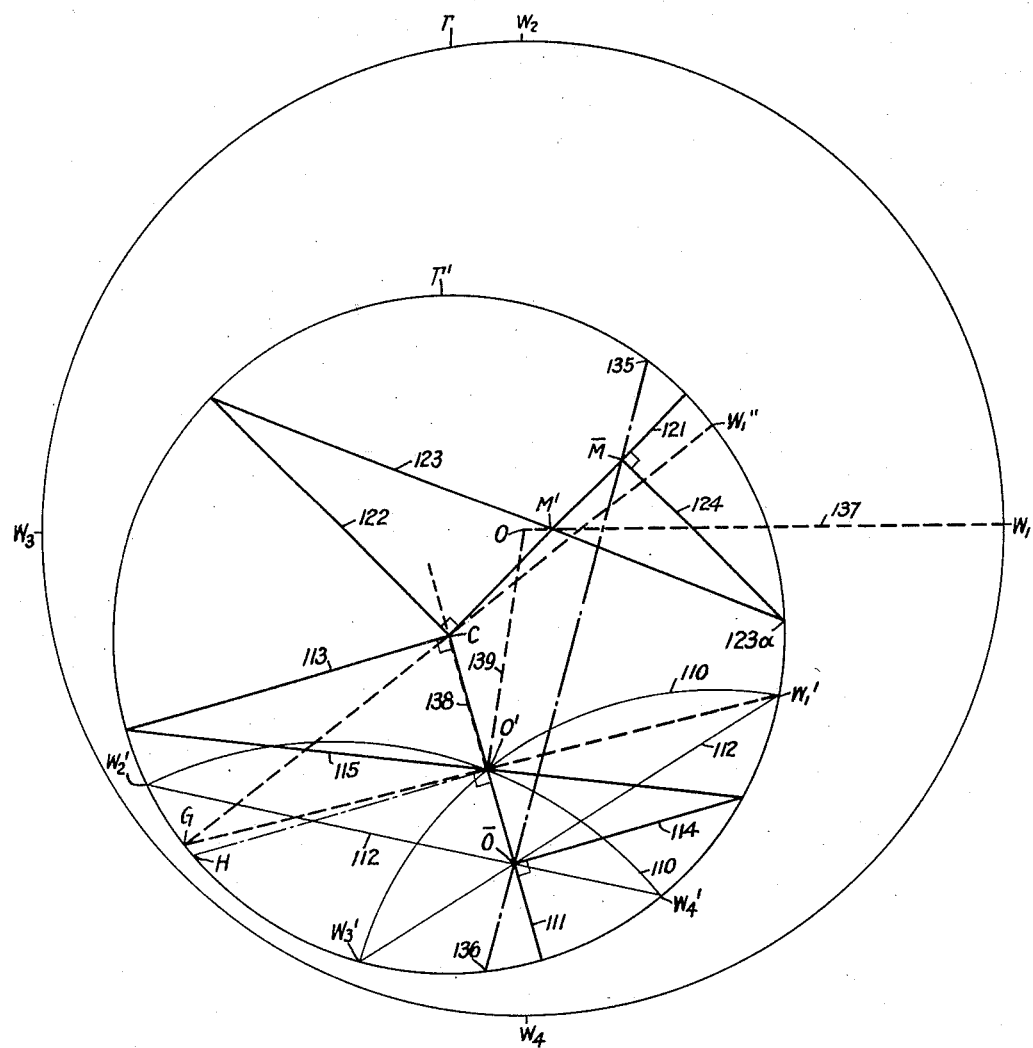

Aug. 5, 1958  G. A. DESCHAMPS  2,845,711
MICROWAVE TRANSMISSION LINE CALCULATOR
Filed Jan. 26, 1953  8 Sheets-Sheet 6

INVENTOR
GEORGES A. DESCHAMPS
BY *Ernest Fanwick*
ATTORNEY

Aug. 5, 1958      G. A. DESCHAMPS      2,845,711
MICROWAVE TRANSMISSION LINE CALCULATOR
Filed Jan. 26, 1953      8 Sheets-Sheet 8

INVENTOR
GEORGES A. DESCHAMPS
BY
*Ernest Fanwick*
ATTORNEY ns Patent Office 2,845,711
Patented Aug. 5, 1958

2,845,711

MICROWAVE TRANSMISSION LINE CALCULATOR

Georges A. Deschamps, New York, N. Y., assignor to International Telephone and Telegraph Corporation, a corporation of Maryland Application January 26, 1953, Serial No. 333,164

5 Claims. (Cl. 33—1)

This invention relates to apparatus and methods for use in solving problems generally encountered in microwave transmission line, waveguide junction, and polarization measurements and more particularly to apparatus and methods for determining reflection coefficients or impedances of transmission lines and the polarization of propagated microwave energy.

Those persons well versed in the technique of microwave measurements have long been stymied by the laborious mathematical calculations involved in obtaining certain often used parameters, such as reflection coefficients. For instance, at microwave frequencies a convenient way of measuring reflection coefficients is to sample the standing wave pattern produced in a slotted line. Very often the reflection coefficient has to be known in a waveguide which is connected to the slotted line by some junction having unknown transmission characteristics. Even with a waveguide carefully fitted to the slotted line, the discontinuity at the end of the slot, although small for most practical purposes, cannot be neglected in a precision measurement. The junction usually presents a mismatch to the slotted line or waveguide or to both so that the measured reflection coefficient is modified by the junction characteristics, and quite often the junction characteristics are not known and may be difficult to determine.

At present when confronted with a problem of correcting an experimental measurement to allow for the error introduced by an unknown junction, one attempts to find, from impedance measurements, an equivalent circuit to generally describe the junction and to correct his experimental measurements by further computations to allow for the equivalent circuit. This calculating process becomes quite complicated, especially when the junction has losses.

Another problem is that when one plots impedances of a given load on the well-known Smith chart in order to convert them into reflection coefficients for a given line, he must first normalize them, i. e. divide by the characteristic impedance of the line which corresponds to the center of the Smith chart. A change in this characteristic impedance level when various lines are connected to the same load usually means a replotting after a computation to determine the normalized impedance (i. e. renormalization).

One of the objects of this invention therefor is to provide apparatus and methods which will quickly, efficiently, and easily solve transmission line, waveguide junction and polarization problems.

Another object of this invention is to provide methods and apparatus by which the reflection coefficients or impedances of transmission lines may be measured directly by graphic interpretation.

A further object of this invention is to provide methods and apparatus for obtaining the reflection and transmission coefficients of waveguide junctions in both phase and magnitude by the graphic interpretation of representative points plotted on transmission line charts.

Figs. 1, 5, and 6 are various embodiments of the measuring device of this invention;

Figs. 2A, 2B, 3A, 3B, 3C, and 3D are graphic representations of the Smith and Projective transmission line charts for use with the measuring devices of this invention;

Figs. 4A, 4B, and 4C are illustrations helpful in explanation of the plotting of reflection coefficients of various transmission line charts;

Figs. 7 and 9 are schematic diagrams of the test equipment for measuring reflection coefficients through an arbitrary junction;

Fig. 8 is a graphic construction helpful in the explanation of the use of the measuring devices of this invention;

Figure 2A:
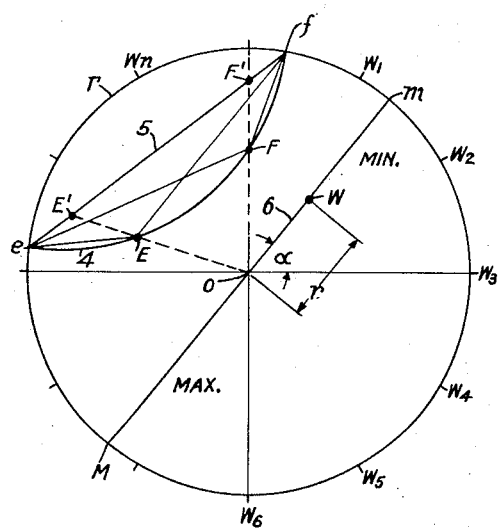

Referring to Fig. 1 of the drawing, one form of measuring device for use in accordance with the principles of this invention is shown, comprising a base 1 composed of a suitable transparent material, such as glass or plastic. The illustrated device is in the form of a rectangle OYVX. The base 1 carries a plurality of radial lines 2 converging at corner O of the rectangle OYVX. In order to determine the correct spacing for radial lines 2, a line IJ is constructed joining sides OY and OX of the rectangle OYVX in such a manner that the midpoint D of the line IJ lies on the angle bisector OZ of the angle YOX. The angle bisector passing through the midpoint of line IJ is designated zero decibels and the boundary lines OY and OX passing through the points I and J are each designated infinite decibels.

The graduations of the points on line IJ between the zero and infinite decibel graduations are such that the graduation in decibels of any point A between zero and infinity is equal to $$20 \log_{10} \frac{AI}{AJ} : \frac{DI}{DJ}$$

Since point D was defined as the midpoint between I and J, $$\frac{DI}{DJ} = 1$$

and the graduation assigned to point A is simply $$20 \log_{10} \frac{AI}{AJ}$$

The factor of $20 \log_{10}$ is used to allow the graduations to be in decibels to conform with usual engineering practice. When line IJ has been graduated into decibels, radial lines 2 representing convenient decibel values may be joined to point O and extended to sides YV and VX of rectangle OYVX.

An alternate method of graduating the radial lines 2 of the measuring device shown in Fig. 1 is to construct an arbitrary line I"J" joining any point I" on side OY with any point J" on side OX. The radial lines 2 may be graduated such that the numeral calibration of any point $x$ on line I"J" is equal to:

$$20 \log_{10} \frac{xI''}{xJ''}$$

The measuring device of Fig. 1 is designed to measure the cross ratio distance in decibels (hereianfter called the decibel distance) between two points, referred to points on the boundary lines OX and OY. Thus the decibel distance between points A and B, referred to boundary points I and J which are the intersections of a straight line joining points A and B and the boundary lines OY and OX, is equal to $$[AB]_{IJ} = 20 \log_{10} \frac{AI}{AJ} : \frac{BI}{BJ}$$

and may be read directly in decibels by utilizing the measuring device of Fig. 1. The device is located in such a manner that boundary lines OY and OX pass through reference points I and J and the decibel distance between points A and B are determined from the radial lines 2 which have been graduated in a manner heretofore described. In Fig. 1 of the drawing it is seen that point A falls on the radial line graduated 2 db while point B falls on the radial line graduated 10 db. Since both points A and B are on the same side of the zero decibel line OZ, the decibel distance AB referred to IJ is equal to 8 db. If the points between which the decibel distance is to be measured are located on opposite sides of the zero decibel line OZ, then the values of each point as determined by the radial lines 2 must be added.

The decibel distance has the important property of additivity (as an ordinary distance) and furthermore has the important property of invariance under transformations which may represent the effect of any linear junction or impedance and polarization transformers. Due to the property of invariance, if the points A and B are projected to any other reference line, such as line 3, the cross ratio of the projected points A' B' referred to the projected reference points I' and J' which are located by the intersections of line 3 with the boundary lines OX and OY, will be equal to the cross ratio of the original points A and B referred to the boundary lines OX and OY. Thus the decibel distance between points A and B referred to points I and J is equal to the decibel distance between points A' and B' referred to points I' and J'.

It is well known to those skilled in the art, that transmission line charts may be utilized to graphically represent the effect of linear junctions. Perhaps the most well known of these transmission line charts is the Smith chart. Referring to Fig. 2A, the cross ratio distance between any two points E and F, referred to the unit circle Γ of a transmission line chart when expressed in decibels, can be interpreted as the mismatch between the two impedances graphically represented by points E and F on transmission line chart. When a Smith chart is utilized to plot the impedances of the two points E and F, the mismatch or cross ratio distance must be measured by utilizing the chords of the arc 4 of a circle orthogonal to the unit circle Γ of the Smith chart. Thus as shown in Fig. 2A the decibel distance between points E and F referred to the intersections $e$ and $f$ of the arc 4 with the unit circle Γ is equal to:

$$[EF]_\Gamma = 20 \log_{10} \left( \frac{Ee}{Ef} : \frac{Fe}{Ff} \right)$$

However, as shown in Fig. 2A, the points E and F located on the orthogonal arc 4 may be projected onto a straight line 5 and the decibel distance between points E and F referred to the unit circle Γ of the Smith chart may be measured along the straight line 5 to obtain the mismatch in decibels between the two impedances represented by points E and F but the decibel distance between the projected points E' and F' is only equal to ½ the decibel distance measured by utilizing the plotted points E and F. Thus:

$$[EF]_\Gamma = \frac{1}{2} <E'F'>_{ef}$$

$$[EF]_\Gamma = 20 \log_{10} \frac{Ee}{Ef} : \frac{Fe}{Ff}$$

and $$<E'F'>_{ef} = 10 \log_{10} \frac{E'e}{E'f} : \frac{F'e}{F'f}$$

At microwave frequencies the reflection coefficients are often determined by standing wave ratio measurements. As shown in Fig. 2A, the position of a probe detecting the standing wave within a half wavelength of a slotted line can be represented by points $W_1, W_2, W_3, \ldots W_n$ uniformly distributed along the perimeter of a unit circle Γ, i. e. the circle has a radius of one relative to a given center O. The positions of minimum and maximum pickup for the probe are respectively represented by two points $m$ and M on a diameter 6 of the unit circle Γ. If one plots on this diameter 6 the point W such that the ratio of the distance between WM and W$m$ equals the voltage standing wave ratio, one obtains the well-known Smith chart representation. The distance $r$ from W to the center O of the unit circle Γ is representative of the magnitude of the reflection coefficient, and the angle α made by the radial line OW with some fixed reference point, such as $W_3$, indicates the phase of the reflection coefficient.

However the apparatus and methods of this invention may best be utilized by a novel transmission line chart called a projective chart which may be considered as an alternative of the Smith chart in the representation of reflection coefficients.

Figure 2B:
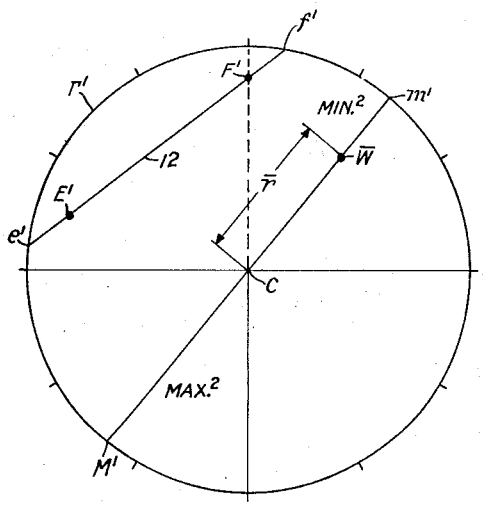

If, as shown in Fig. 2B, one obtains the probe positions for minimum and maximum pickup and graphically represents them as points $m'$ and M' on the perimeter of a unit circle Γ' but now obtains a point $\overline{W}$ such that the ratio of $\overline{W}M'$ to $\overline{W}m'$ equals the power standing wave ratio, the projective chart is obtained. The distance $\bar{r}$ from $\overline{W}$ to the center C of the unit circle Γ' is related to $r$ by $$\frac{1+\bar{r}}{1-\bar{r}} = \left(\frac{1+r}{1-r}\right)^2$$

or $$\bar{r} = \frac{2r}{1+r^2}$$

The polarization of a plane wave may be represented by locating $\overline{W}$ since $M'\overline{W}$ is substantially equivalent to the major axis of an elliptically polarized wave and $\overline{W}m'$ is substantially equal to the minor axis of the incident wave.

Figure 3A:
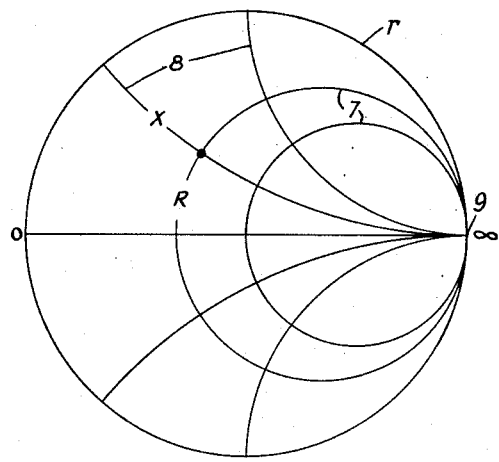
Figure 3B:
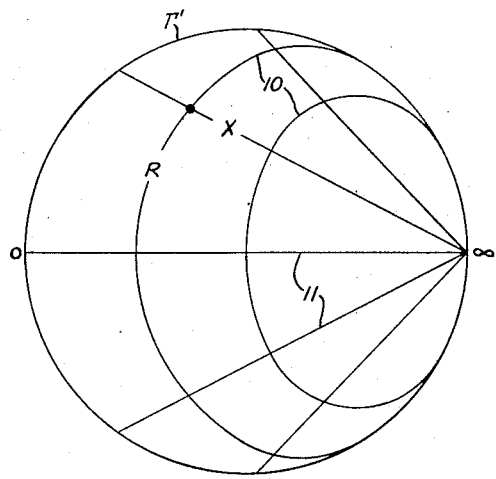

If the plotting is done from impedance measurements, it is useful to have drawn in advance on either the Smith or projective chart the loci on which R and X are constants, and in some instances it is advantageous to have the lines of constant magnitude and phase of the reflection coefficients drawn in advance, R and X, as used throughout the disclosure and in the figures respectively represent resistance and reactance. Thus as shown in Fig. 3A on the Smith chart, the loci of points of constant R appear as the well-known set of circles 7 while the loci of points of constant X appear as arcs 8 of circles orthogonal to the unit circle Γ and all passing through a common point 9 representing infinity. As shown in Fig. 3B these well-known sets of circles 7 of the Smith chart appear as ellipses 10 on the projective chart having a unit circle Γ'' whereas the arcs 8 of the orthogonal circles of the Smith chart appear as straight lines 11 on the projective chart. Since the orthogonal arcs of the Smith chart are transformed into straight lines on the projective chart when the projective chart is utilized to plot the impedance of two points E' and F' as in Fig. 2B, the mismatch or decibel distance is measured along the straight line 12, Fig. 2B, joining the plotted points E' and F' referred to the intersecting of line 12 with the unit circle Γ', or in other words measured on a Smith chart $$[EF]_\Gamma = 20 \log_{10} \left( \frac{Ee}{Ef} : \frac{Fe}{Ff} \right)$$

and measured on a projective chart $$<E'F'>_{\Gamma'} = 10 \log_{10}\left(\frac{E'e'}{E'f'} : \frac{F'e'}{F'f'}\right)$$

Referring to Figs. 3C and 3D, it is seen that lines of constant magnitude of |Z| appear as straight lines 13 on the projective chart instead of the arcs 14 of the Smith chart, and the loci of constant phase $\hat{Z}$ appears as ellipses 15 having a common major axis 16 instead of the arcs 17 of circles of the Smith chart.

For most applications utilizing the apparatus and methods of this invention, the interpretation of the decibel distance between two points referred to a unit circle of a transmission line chart is required. If a reflection coefficient is graphically represented by a point W on the Smith chart and $\overline{W}$ on the projective chart, the standing wave ratio expressed in decibels is represented by the distance from the graphically represented point W to the center O of the Smith chart or by one half the distance from the graphically represented point $\overline{W}$ to the center C of the projective chart.

The use of the decibel distance is justified because of its extremely desirable properties of additivity and invariance. Referring to Figs. 4A and 4B, the invariant property of the decibel distance is illustrated when loads 18 and 19 are successively coupled to transmission line 20 by means of a switch 21 and the reflection coefficients measured at terminal 22 for each of the two loads 18 and 19 are graphically represented on a projective transmission line chart having a unit circle Γ by points 18a and 19a. If a straight line 23 is drawn through points 18a and 19a to its intersections 24 and 25 with the unit circle Γ, the decibel distance between 18a and 19a with respect to points 24 and 25 may be measured. When the reflection coefficients of two loads 18 and 19 are measured at terminals 26 on the opposite side of junction 27 which may be assumed to be lossy, the unit circle Γ is transformed into an ellipse Γ' and the points 18a and 19a are transformed into points 18a' and 19a'. Points 24 and 25 on the unit circle Γ are transformed into points 24' and 25' on ellipse Γ' and also fall on a straight line 23' with points 18a' and 19a'. The decibel distance between 18a and 19a measured with respect to points 24 and 25 is invariant, i. e. identical, with the decibel distance between points 18a' and 19a' with respect to points 24' and 25'. However, if junction 27 is lossless, it is found that the unit circle Γ is transformed into another circle having the same radius and center and then the decibel distance between points 18a and 19a and 18a' and 19a' are both measured with respect to the same unit circle and still remain invariant.

Referring to Fig. 4C if the reflection coefficients of loads 18 and 19 are measured in the manner heretofore explained and graphically represented on a Smith chart having a unit circle Γ, it is seen that the points 18a and 19a fall on the arc 28 of a circle orthogonal to the unit circle Γ of the Smith chart. If the reflection coefficients are now measured at terminal 26 on the opposite side of junction 27 from loads 18 and 19, it is seen that the unit circle Γ of the Smith chart is transformed into another circle Γ' within the unit circle Γ and the points 18a and 19a are transformed into points 18a' and 19a' located on an arc 28' within the transformed unit circle Γ'. In order to measure the decibel distance between the graphically represented reflection coefficients 18a and 19a and the unit circle Γ of the Smith chart, the points are projected onto a chord 29 of the orthogonal circle arc 28 and the decibel distance measured along the chord 29 referred to its intersections with the unit circle Γ. In a similar manner the decibel distance along the arc 28' between points 18a' and 19a' referred to its intersections with the transformed unit circle Γ' may be measured by projecting the points 18a' and 19a' onto chord 29'. Since the chords of circles orthogonal to the unit circle of a Smith chart are transformed into straight lines in the projective chart, projecting the points lying on the arc of the orthogonal circle onto the chord converts the transformed unit circle Γ' of the Smith chart into the unit circle of a projective chart.

For engineering use, it is convenient to have the measuring device of Fig. 1 graduated in decibels by designating the angle bisector OZ as zero decibels and assigning decibel measurements to each of the radial lines 2 on either side of the zero line to form a scale graduated in decibels along YV and VX of the measuring device of Fig. 1. As hereinbefore explained, a portion of the line OZ which is designated OD' is laid off equal to OX and a perpendicular 3 drawn from point D' on the angle bisector to point I' on the side OY of the rectangle. It will be found that lines OD' and D'I' are equal to side OX and hence also equal to the unit radius of a transmission line chart. Side OY of the measuring device is made equal to twice the length of side OX. Line D'I' represents a projection of the scale along sides YV and VX, that is if any tyo points A' and B' are connected by a straight line 3 intersecting the sides OX and OY at points I' and J', respectively, and the projections A, B, I, and J of these four points A', B', I', and J' are laid off on the projected line D'I', the decibel distance A'B' relative to I'J' is equal to the decibel distance AB relative to IJ which are the projections of points I' and J'. Thus along D'I' a scale of standing wave ratio in decibels may be printed, while for convenience parallel to side X a decimal division O'X' of the chart radius OX may be laid off for evaluating reflection coefficients. The standing wave ratio between points A' and B' illustrated in Fig. 1 is equal to 10 decibels (the magnitude of point A') minus 2 decibels (the magnitude of point B') or 8 decibels.

Referring to Fig. 5 of the drawing a modified version of the measuring device of this invention is shown for use with a transmission line chart having an extremely large unit radius. Two arms 31 and 32 rotatable about pivot point 33 are utilized to form the boundary lines 31' and 32' of the measuring device. If desired the two arms 31 and 32 may be fixed to form the sides of any convenient angle such as 90° or 60°. A scale 34, graduated as a decibel standing wave scale similar to the scale D'I' of Fig. 1, is slidably mounted between the arms 31 and 32 by sleeves 31a and 32a and pivots 31a' and 32a'. The pivots 31a' and 32a' are located at the intersections of scale 34 and boundary lines 31' and 32'. A moving arm 35 rotatable about the intersection 33 of arms 31 and 32 intersects the scale 34. The intersection of moving arm 35 and scale 34 yields the decibel standing wave ratio reading. A decibel distance may be measured by locating the boundary lines 31' and 32' on the reference points and placing moving arm 35 successively adjacent to the two points between which the decibel distance is to be measured, and the two readings on scale 34 for the successive positions of moving arm 35 are either subtracted or added depending whether the points are on the same or opposite sides of the zero decibel graduation, as the case may be, to obtain the standing wave ratio. Thus if movable arm 35 is placed adjacent to point B a reading of ten decibels is obtained, and when placed adjacent to point A, a reading of two decibels is obtained. Subtracting one reading from another, a difference of 8 decibels is measured which is seen to be identical with the reading obtained by the use of the device illustrated in Fig. 1.

Referring to Fig. 6, another embodiment of the measuring device of this invention is shown for use in measuring decibel distances. The measuring device of Fig. 6 takes the form of a triangle avc having a standing wave ratio scale 36 graduataed along one side bc. Scale 36 is similar to scale 3 of the device shown in Fig. 1. Radial lines 37 extending from the apex a of the triangle abc to scale 36 are marked off in a manner similar to the markings of the radial lines 2 shown in Fig. 1. An ordinary decibel scale 38, similar to the scale ZX of the device shown in Fig. 1, is constructed such that a perpendicular 38' erected from the intersection of scale 38 and side *ab* will have a length equal to the unit radius of a transmission line chart. The decibel distance between any two points on the measuring device of Fig. 6 referred to the boundary sides *ab* and *ac* is maintained invariant when the two points are projected to a transverse line at any other location and again referred to the sides *ab* and *ac*.

The following solution for typical problems encountered by persons endeavoring to make microwave measurements will illustrate the use of the apparatus and methods of this invention.

Problem 1

Many instances arise where it is necessary to measure reflection coefficients (or impedance) through an arbitrary junction whose scattering parameters are unknown. The present method eliminates the need for finding equivalent circuits for the unknown junction and correcting the measurements of the unknown obstacles by computation to allow for the arbitrary junction. As shown in Fig. 7, the test set up comprises a source of microwave energy 100 coupled to a usual slotted line 101 having a probe 102 and detector 103 to measure standing wave ratios. The arbitrary or unknown junction 104 is coupled to the slotted line 101 at terminal 105 and to a waveguide section 106 at terminal 107. In order to calibrate the unknown junction 104, a short circuit 108 is moved in equal steps, for instance, from a first position representing an open circuit at terminal 107 in steps of one-eighth of a waveguide wavelength, and the reflection coefficient at terminal 107 for each of the calibrating points may be plotted on a Smith transmission line chart to form a circle Γ having a unit radius as shown in Fig. 8 wherein point $W_1$ is the measurement when an equivalent open circuit is located in waveguide 106 (i. e. a short circuit one quarter waveguide wavelength or odd multiple thereof in back of terminal 107) and points $W_2$, $W_3$, and $W_4$ represent the readings taken with the short circuit 108 moved by successive intervals of one-eighth of a waveguide wave length. Thus moving the short circuit plunger 108 in line 106 produces at terminal 107 reflection coefficients of unit amplitude and known phase. Measuring the standing waves in line 101 for the various positions of short circuit 108 by use of the probe 102 and detector 103, corresponding reflection coefficients at terminal 105 are obtained and plotted on the Smith chart as points $W_1'$, $W_2'$, $W_3'$, and $W_4'$ as shown in Fig. 8. When plotted to the same scale, the reflection coefficients W measured at terminal 107 are transformed to the reflection coefficients W' measured at terminal 105 due to the transfer characteristics of the unknown junction 104. The reflection coefficients W' measured at terminal 105 are plotted, and they are seen to fall on the perimeter of a circle Γ' which is the transformation of the unit circle Γ due to the characteristics of the unknown junction 104. A point O' is designated as the "match point" and may be defined as the transformation of the center O of unit circle Γ due to the characteristics of the unknown junction 104. The match point O' has the important property of being the point of intersection of a family of circles 110 orthogonal to the transformed unit circle Γ' each of the circles 110 passing through opposite reflection coefficient points W'.

As shown in Fig. 8, one method of locating the match point O' is to construct the radius 111 from the center C of circle Γ' which passes through point $\bar{O}$. Point $\bar{O}$ is the intersection of the straight lines 112 which join opposite reflection coefficient points W' and are therefore chords of the arcs of the family of circles 110 which pass through opposite reflection points W'. Perpendiculars 113 and 114 are then erected from opposite sides of the radius 111 to the perimeter of the circle Γ' from the center C and the point $\bar{O}$. A straight line 115 is constructed connecting the intersections of the perpendiculars 113 and 114 and the perimeter of circle Γ', and where straight line 115 crosses the radius 111 is the location of the match point O', the image of O to the transformation characteristics of the unknown junction 104. This is all the data that is required to completely calibrate and correct further measurements to allow for the characteristics of the unknown junction 104.

A second method of locating the match point O' makes use of the property that the match point O' is located one-half the decibel distance referred to the circle Γ' between the center C and point $\bar{O}$. Thus by placing the measuring device of this invention such as shown in Fig. 1, in such a manner that the boundary lines OX and OY pass through the intersections of radius 111 and the perimeter of circle Γ' while its corner XOY is situated on the perimeter of circle Γ' and locating the point on radius 111, which is equal to one-half the decibel distance between points C and $\bar{O}$, is determined by the scale of the measuring device, the match point O' is located. If the circle Γ' represents a unit circle having a radius equal to side OX of the device shown in Fig. 1, the scale D'I' may be placed directly on the radius 111 and one-half the decibel distance readily determined from the scale D'I' thus locating the match point O'.

In order to measure the reflection due to an unknown obstacle, the obstacle 120 is placed in the line 106 as shown in Fig. 9, and the reflection in the slotted line 101 is measured and plotted as M' on the transmission line chart illustrated in Fig. 8. In order to correct point M' to allow for the transformation due to the characteristics of junction 104, it is necessary to determine point $\bar{M}$. This construction is the reverse of the construction utilized to obtain the match point O' from point $\bar{O}$. In one method a radial line 121 is drawn from the center C of circle Γ' through point M', and line 122 is constructed perpendicular to radius 121 from center C. A line 123 is constructed joining the intersection of the perpendicular 122 and the point M' extending to circle Γ' to locate point 123*a*. Perpendicular 124 is constructed from radius 121 to point 123*a*. The intersection of perpendicular 124 and radius 121 locates point $\bar{M}$ which is the graphical representation of the reflection of obstacle 120 placed in line 106 corrected for the transmission characteristics of the junction 104.

A second method of locating point $\bar{M}$ is through the use of the measuring device of this invention. Point $\bar{M}$ is twice the decibel distance between points C and M' along radius 121 referred to circle Γ'. Thus in a similar manner, as hereinbefore explained, twice the decibel distance between points C and M' is determined, and point $\bar{M}$ is located. Measuring the decibel distance between point $\bar{O}$ and $\bar{M}$ and dividing by two, yields the corrected standing wave ratio in decibels. In order to measure this decibel distance, a line $\bar{O}\,\bar{M}$ is extended to its intersections with circle Γ' forming points 135 and 136. The device of Fig. 1 is placed upon the constructed drawing in such a manner that one side OY falls on point 135 while the other side OX falls on point 136. The decibel readings of points $\bar{O}$ and $\bar{M}$ are obtained in a manner hereinbefore explained. If the readings are on opposite sides of the zero indication of the measuring device, they must be added, or if on the same side they must be subtracted and the total standing wave ratio in decibels of the unknown obstacle corrected for the arbitrary junction 104 is determined.

In order to obtain the correct phase of the reflection due solely to obstacle 120, the line joining $\bar{O}\,\bar{M}$ is extended to its intersection 135 with circle Γ'. Since $W_1'$ is the transformation of an open circuit due to junction 104, it is of known phase, and one is able to obtain the correct phase of the reflection due to obstacle 120 by comparing the phase position of point 135 with the known phase of $W_1'$.

If desired the magnitudes of the scattering coefficients are easily read from the construction of Fig. 8 with the aid of the measuring devices of this invention. The magnitude of the reflection coefficient at terminal 105 of the junction is equal to the length of line OO', and the magnitude of the reflection coefficient on side 105 of junction 104 is equal to the length of line CO' divided by the radius of circle $\Gamma'$, and the magnitude of the transmission coefficient of the junction 104 is equal to line O'H divided by the square root of the radius of circle $\Gamma'$ wherein point H is the intersection of the perimeter of the circle $\Gamma'$ and a perpendicular erected from the radius 111 at the match point O'. These three magnitudes can be evaluated directly in decibels by using the scale XZV of the device shown in Fig. 1.

Problem 2

When microwave energy is transmitted through stratified media, each of the successive media having a different propagation characteristic, the transformation of the reflection coefficient (or impedance) is particularly easy to perform when the methods and apparatus of this invention are utilized.

Figure 10A:
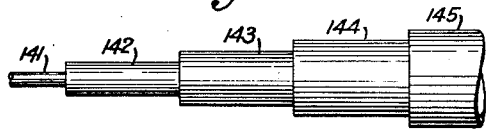
Fig. 10A is a schematic diagram of an electromagnetic wave transmission system having a stratified dielectric media.
Figure 10B:
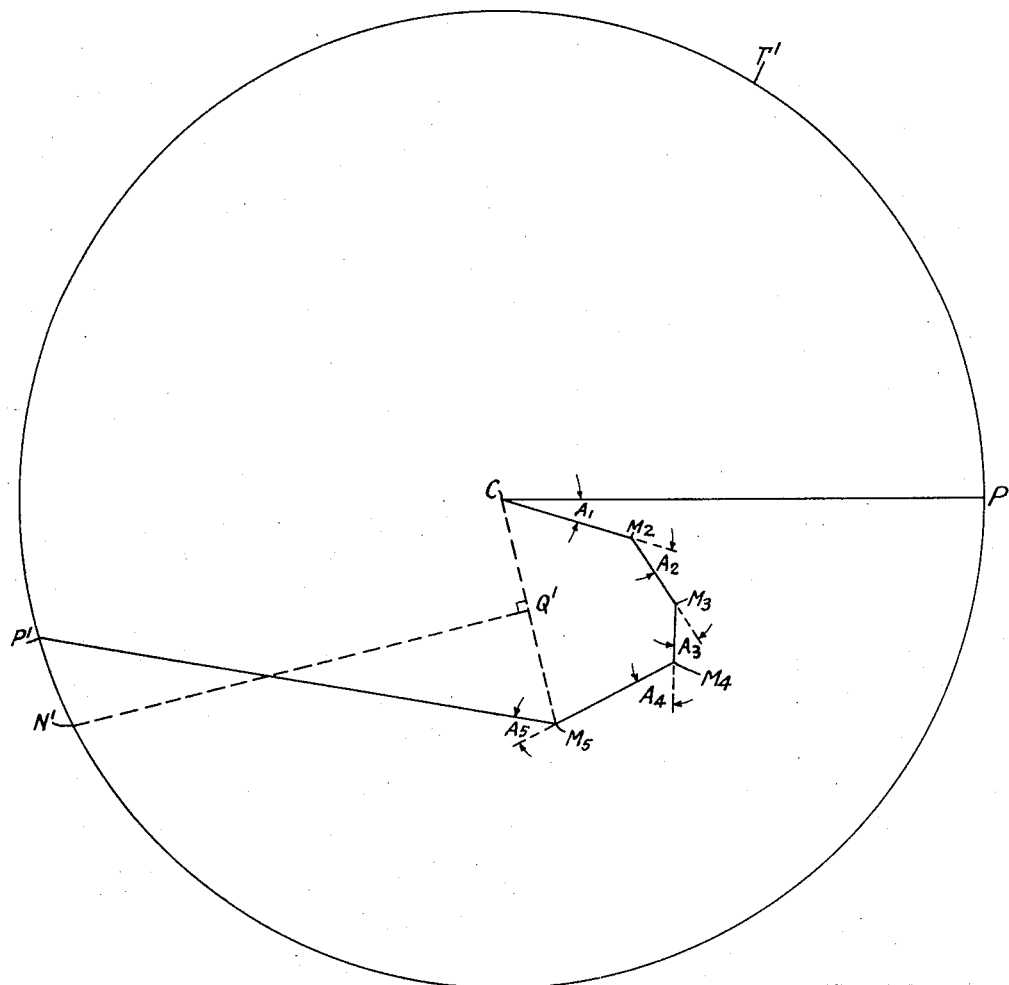
Figs. 10B and 10C are graphic constructions helpful in solving the characteristics of the transmission system shown in Fig. 10A.

Referring to Figs. 10A and 10B, a plurality of successive media therein illustrated comprises successive lengths of waveguides 141, 142, 143, 144, and 145, each length representing one medium having a given characteristic impedance and propagation constant. Another well-known example of the transmission of microwave energy through a stratified media comprises the use of a coaxial cable comprising an inner and outer conductor separated by a dielectric medium. If successive lengths of the cable are separated by different dielectric mediums the electromagnetic wave energy propagated along the cable will pass through successive mediums each having a different propagation constant. Neglecting the capacitive effect of the discontinuity at the transition between successive waveguide sections of Fig. 10 or between successive lengths of coaxial cable each having a different dielectric medium, which is justified for homogeneous media and may be useful as a good approximation when the media are not homogeneous, the determination of the reflection coefficients is accomplished by utilizing the measuring devices of this invention in conjunction with the projective transmission line chart heretofore described.

In order to find the reflection and transmission coefficient due to a succession of $n$ media as described by their characteristic impedance $Z_i$ and their electrical length $\alpha$, it is necessary to compute the successive mismatches by utilizing the formula $$U_i = 20 \log_{10} \frac{Z_i + 1}{Z_i}$$

for the mismatch between one medium $Z_i$ and the next successive medium $Z_i + 1$. If point P on the perimeter of the unit circle $\Gamma'$ of the projective chart represents a known phase and the center C of the unit circle $\Gamma'$ is utilized to represent the starting point, the characteristic polygon for the stratified media may be constructed by constructing an elliptical angle $A_1$ equal to twice the electrical length of the first section of waveguide 141. Since the unit circle $\Gamma'$ usually represents a rotation of 180° the angle $A_1$ is laid off equal to twice the electrical length. The decibel length of line from the starting point C to point $M_2$ is equal to the characteristic impedance mismatch $U_1$ between the first and second sections. By utilizing the measuring devices of this apparatus, the correct decibel length for line $CM_2$ is laid off to determine point $M_2$ which is the starting point for the next step of the construction. Elliptical angle $A_2$ is equal to twice the electrical length of the second waveguide section 142, and the length of line $M_2M_3$ in decibels is equal to the propagation characteristic mismatch $$U_2 = 20 \log_{10} \frac{Z_3}{Z_2}$$

Figure 10C:
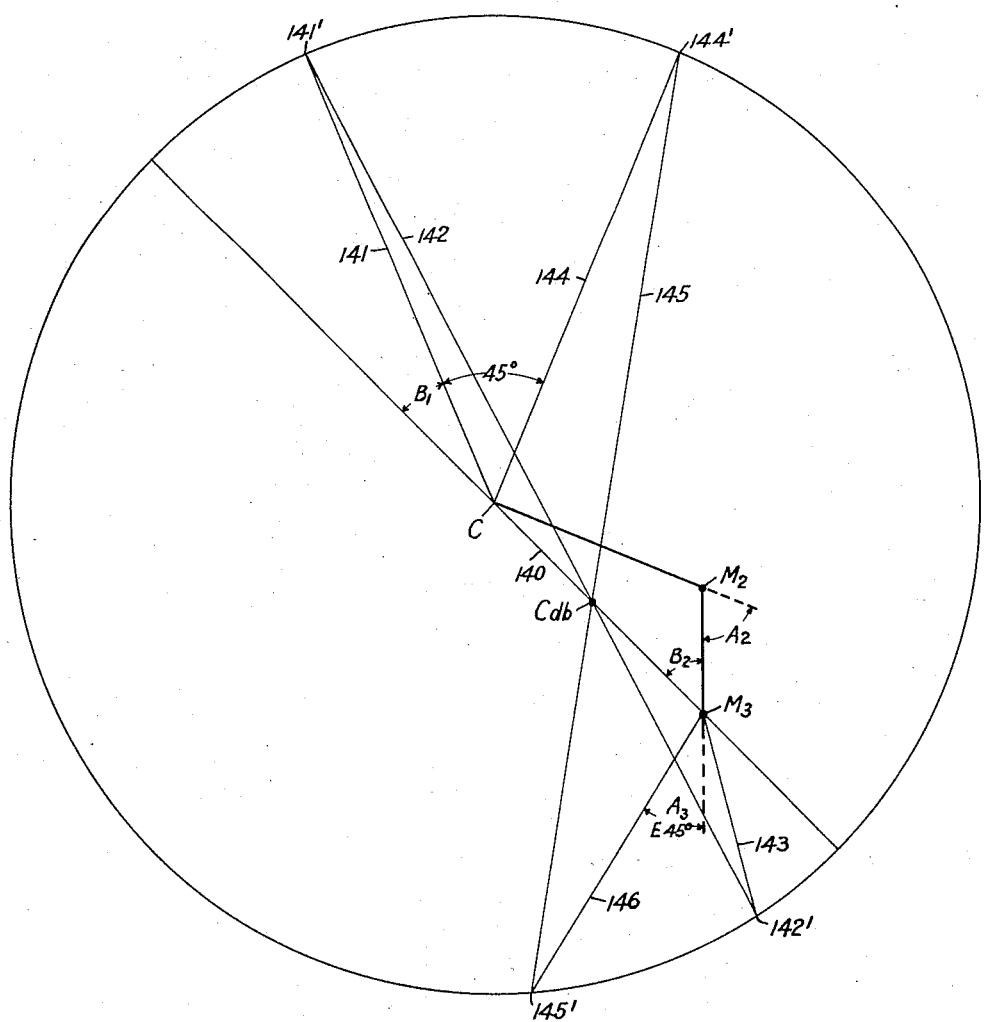

The remainder of the sides of the characteristic polygon are constructed in a similar manner, and the end point $M_5$ corresponds to the reflection coefficient for the stratified media. If we complete the characteristic polygon by the construction of line $CM_5$, the magnitude and phase of the reflection coefficient is readily obtainable by utilizing the measuring devices of this invention. The angles A are elliptical angles rather than the usual circular angles. Referring to Fig. 10C a simple method of constructing an elliptical angle is shown wherein for purposes of illustration it is assumed that elliptical angle $A_3$ is to be constructed equal to 45°. Line 140 joining the center C of the unit circle and point $M_3$ is constructed and the decibel center $C_{db}$ between points C and $M_3$ is located. A line 141 is constructed so that angle $B_1$ is equal to angle $B_2$. From the intersection 141' of line 141 and the unit circle a line 142 is drawn through the decibel center $C_{db}$ to locate point 142'. Line 143 is constructed joining points $M_3$ and 142'. The desired angle, in this illustration 45° is determined using line 141 as a base line and line 144 is constructed in order to locate point 144' on the unit circle. Line 145 is extended from point 144' through the decibel center $C_{db}$ to locate point 145' and line 146 is drawn from point 145 to point $M_3$. The desired elliptical angle $A_3$ of 45° is between line 146 and the extension of line $M_2M_3$. In a similar manner all other elliptical angles may be formed.

If we complete the polygon by the construction of line $M_5P'$, which may be accomplished by making elliptical angle $A_5$ equal to the electrical length of the fifth waveguide section 145, line CP is carried on the line $M_5P'$ due to the transformation through the five sections of waveguide, and the transformation is described completely. One extremely useful function of this method of determining the reflection and transmission coefficients due to the transformation through stratified media is the use to which it may be applied when it is desired to have the reflection coefficient equal to zero. A reflection coefficient equal to zero or matching is graphically represented by getting the polygon of Fig. 10B to close. By making the electrical length of section 5 such that angle $A_3$ causes the reference point P' to be located in such a position that line $M_5P'$ makes the same angle with $CM_5$ as CP makes with $CM_5$, the transformation becomes reversible and the transmission coefficient is in quadrature with the reflection coefficient. The magnitude of the transmission coefficient is, of course, the square root of $1 - r^2$ where $r$ is equal to the magnitude of the reflection coefficient.

Problem 3

Figure 11A:
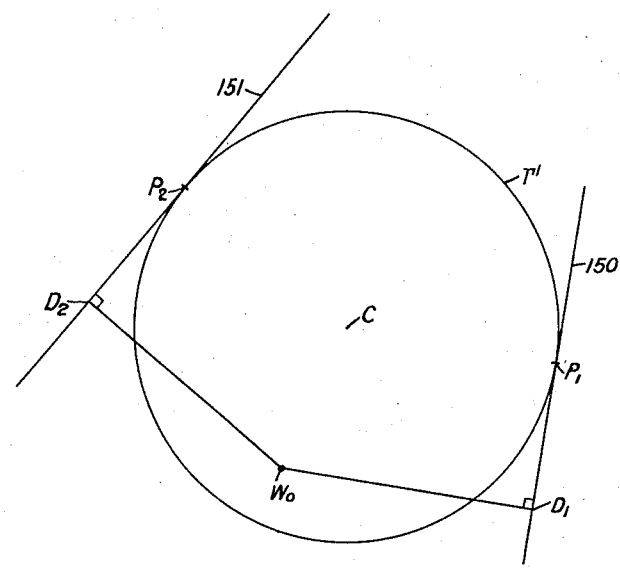
Figs. 11A and 11B are additional graphic constructions helpful in the solution of problems through the use of the measuring devices of this invention.

Certain physical quantities, such as power absorbed by a load, energy density in a transmission line, or power flow in a polarized plane wave, can be represented on the projective transmission line chart by straight line distances. For example, the power picked up by a probe in a slotted line varies as the distances between the graphical representation of the reflection coefficient in the line and a straight line tangent to the unit circle of the chart at a point which represents the probe position in the slotted line. Referring to Fig. 11A, if point $W_0$ represents the reflection coefficient of the transmission line plotted on a projective transmission line chart having a unit circle $\Gamma'$ and point $P_1$ graphically represents the phase position of probe, the distance between $W_0$ and line 150 which is tangent to the unit circle at the probe position $P_1$ is proportional to the power picked up by the probe in the slotted line. Due to the properties of the generator and the load connected to the line, a constant must be considered before an absolute magnitude of power is obtained from the distance $W_0D_1$. In order to eliminate this factor, a second probe position is assumed represented by point $P_2$ on the unit circle $\Gamma'$ of the transmission chart, and the distance between the tangent 151 to the unit circle at probe position $P_2$ and the graphical representation of the reflection coefficient of the line $W_0$ is determined enabling us to obtain the ratio of the powers detected by the two probes from the fact that the ratio of the power detected by the first probe to the power detected by the second probe is proportional to the ratio of the distances between $W_0$ and $D_1$ and $W_0$ and $D_2$. The proportionality factor is still dependent upon the properties of the probe and the perfection in matching the probes to their detectors.

Figure 11B:
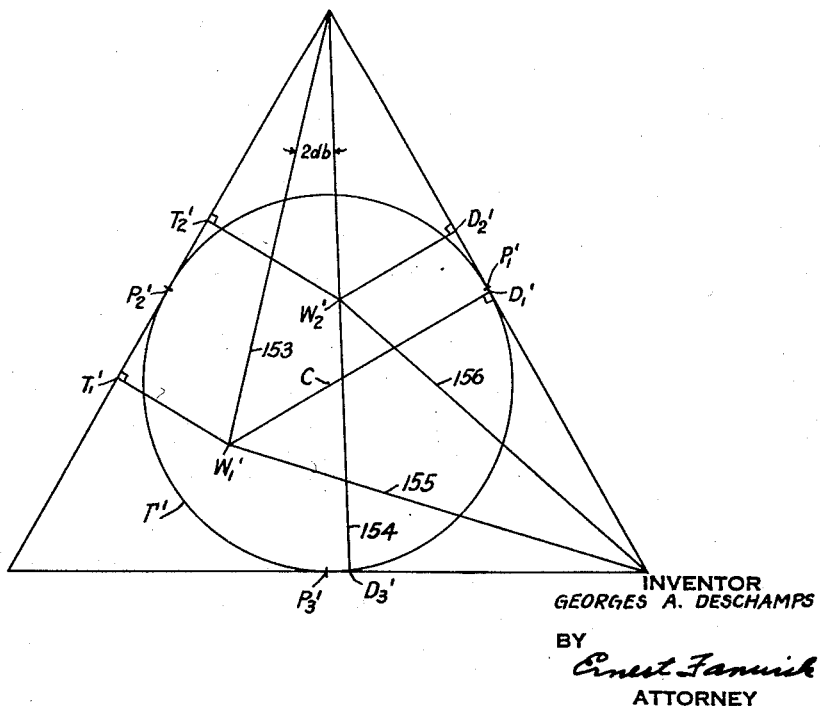

In order to eliminate this proportionality factor, it is possible to compare the power ratios for two different loads. Thus, referring to Fig. 11B, if point $W_1'$ graphically represents the reflection coefficient in the transmission line due to a first load and $W_2'$ graphically represents the reflection coefficient in the transmission line due to a second load, we are able to obtain the ratio of the power detected by the first probe $P_1$ to the power detected by the second probe $P_2$ with the first load connected to the line by measuring the distances $W_1'$ $D_1'$ and $W_1'$ $T_1'$. We are also able to measure the ratio of powers detected by the first and second probes when the second load is connected to the line, and these are proportional to the distances $W_2'$ $D_2'$ and $W'$ $T'$. The decibel distance between $W_1'$ and $W_2'$ is equal to $$10 \log_{10} \left(\frac{P_1'}{P_2'}\right)_1 : \left(\frac{P_1'}{P_2'}\right)_2$$

where the decibel distance is measured with respect to the intersection of $W_1'$ $W_2'$ with the tangents.

If we know the load $W_1'$ and are attempting to determine the load $W_2'$, it is necessary to obtain the power measurements of the two probes with the unknown load $W_2'$ connected to the line. A line 153 is constructed from point $W_1'$ to the intersections of the tangents of probes 1 and 2. If it is assumed that with $W_1'$ connected to the line, the power measured by the second probe exceeds the power measured by the first probe by 3 db, and with $W_2'$ connected to the line the power measured by the second probe exceeds the probe measured by the first probe by 5 db, it is necessary to construct line 154 at a distance of 2 db from line 153 since the difference of the power measurements is 2 db. Since the second measurement difference is greater than the first measurement distance line 154 is nearer to the tangent of probe 2. Line 154 will be the locus for all graphical representations of possible loads. If a third probe position $P_3$ is assumed, we are able to determine the exact point which graphically represents the unknown load from the power measurements of the third probe position. Lines 155 and 156 are constructed in a manner similar to line 153 and 154 but using the power measurements of the first and third probe positions. The intersection $W_2'$ of lines 154 and 156 represents the characteristics of the unknown load.

While I have described above the principles of my invention in connection with specific apparatus and examples, it is to be clearly understood that this description is made only by way of example and not as a limitation to the scope of my invention as set forth in the objects thereof and in the accompanying claims.

I claim:

1. In combination, a transmission line chart having a unit impedance circle and scales for graphically representing transmission line impedances by points within said unit circle, and a measuring device cooperating with said chart having a member including at least first and second edges disposed at an angle to each other and defining a corner at the junction thereof, said member being adapted to be positioned so that said edges intersect said unit circle at predetermined points, the diameter of said chart being less than the distance between the ends of said edges and a series of marks disposed at predetermined angles to one another and when projected converging at said corner, one of said marks lying on the angle bisector of said corner and said series of marks between said mark lying on the angle bisector and said edges being calibrated whereby the relationships between points graphically represented on said chart are determined from said calibration.

2. In combination a transmission line chart for graphically representing transmission line impedances having a unit impedance circle, arcs passing through a common point on said circle orthogonal to said circle representing the loci of points of constant reactance and circles passing through said common point representing the loci of points of constant resistance and a measuring device cooperating with said chart having a member including at least first and second edges disposed at an angle to each other and defining a corner at the junction thereof, said member being adapted to be positioned so that said edges intersect said unit circle at predetermined points, the diameter of said circle being less than the distance between the ends of said edges a series of marks disposed at predetermined angles to one another and when projected converging at the said corner, one of said marks lying on the angle bisector of said corner and said series of marks between said angle bisector and said edges being calibrated whereby the relationships between points graphically represented in said chart are determined from said calibration.

3. In combination a transmission line chart for graphically representing transmission line impedances having a unit impedance circle, a plurality of ellipses all having a given diameter of said circle as their major axis and all having their minor axes in alignment, said ellipses representing the loci of all impedances of constant phase and a plurality of parallel lines each perpendicular to said major axis representing the loci of all impedances of constant magnitude, and a measuring device cooperating with said chart having a member including at least first and second edges disposed at an angle to each other and defining a corner at the junction thereof, said member being adapted to be positioned so that said edges intersect said unit circle at predetermined points, the length of said major axis being less than the distance between the ends of said edges, a series of marks disposed at predetermined angles to one another and when projected converging at said corner, one of said series lying on the angle bisector of said corner and representing zero decibels, and said edges representing infinite decibels and said series of marks between said angle bisector and said edges being calibrated in decibels whereby the relationships between points graphically represented in said chart are determined from said decible calibration.

4. In combination a transmission line chart for graphically representing transmission line impedances having a unit impedance circle, a plurality of straight lines all emanating from a predetermined point on said circle representing the loci of points of constant reactance and a plurality of ellipses whose minor axes are in alignment with the diameter of said circle passing through said point and whose major axes are perpendicular to said diameter, said ellipses representing the loci of all points of constant resistance, and a measuring device cooperating with said chart having a member including at least first and second edges disposed at an angle to each other and defining a corner at the junction thereof, said member being adapted to be positioned so that said edges intersect said unit circle at predetermined points, the diameter of said circle having a length less than the distance between the ends of said edges, a series of marks disposed at predetermined angles to one another and when projected converging at said corner, one of said series lying on the angle bisector of said corner and representing zero decibels, and said edges representing infinite decibels and said series of marks between said angle bisector and said edges being calibrated in decibels whereby the relationships between points graphically represented in said chart are determined from said decibel calibration.

5. In combination, a chart having a circle and means for representing points within said circle, and a measuring device cooperating with said chart having a member including at least a first and second edge disposed at an angle to each other and defining a corner at the junction thereof, said member adapted to be positioned so that said edges intersect said unit circle at predetermined points, the diameter of said chart being less than the distance between the ends of said edges and a series of marks disposed at predetermined angles to one another and when projected converging at said corner, one of said marks lying on the angle bisector of said corner and said series of marks between said mark lying on the angle bisector and said edges being calibrated whereby relationships between points graphically represented on said chart are determined from said calibration.

References Cited in the file of this patent

UNITED STATES PATENTS

| | | |
|---|---|---|
| 666,455 | Bannihr | Jan. 22, 1901 |
| 1,232,290 | Grunberg | July 3, 1917 |
| 1,245,304 | Zona | Nov. 6, 1917 |
| 1,661,095 | Rowe | Feb. 28, 1928 |
| 2,140,914 | Kothny | Dec. 20, 1938 |
| 2,222,925 | West | Nov. 26, 1940 |
| 2,304,797 | Collins | Dec. 15, 1942 |
| 2,523,050 | Nighswander | Sept. 19, 1950 |
| 2,636,674 | Levine | Apr. 28, 1953 |

FOREIGN PATENTS

| | | |
|---|---|---|
| 454,654 | Great Britain | Oct. 5, 1936 |

OTHER REFERENCES

Deetz et al.: "Elements of Map Projection," special publication No. 68, Fifth Edition, U. S. Dept. of Commerce, Coast and Geodetic Survey, pages 44, 45 printed by U. S. Government Printing Office, 1945.